Jan. 17, 1961   T. J. R. BRIGHT   2,968,072
DRAUGHT EXCLUDING STRIPS, BEADINGS, MOULDINGS OR THE LIKE
Filed April 29, 1954   2 Sheets-Sheet 1
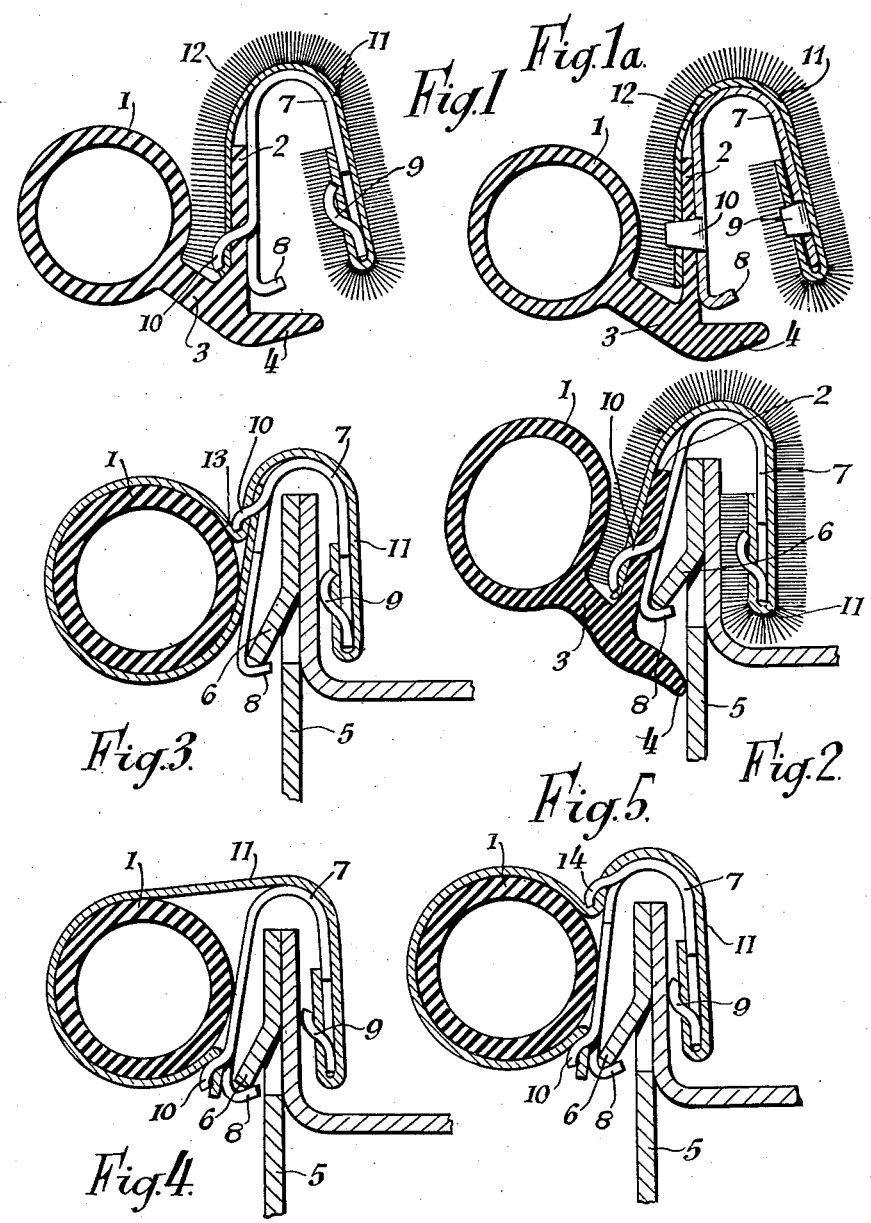
INVENTOR

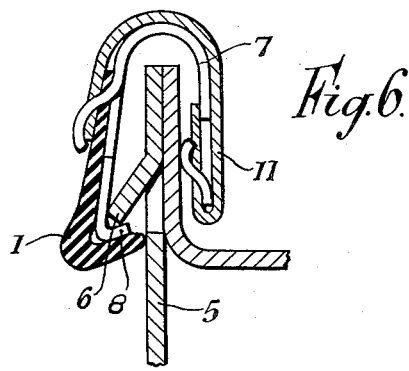
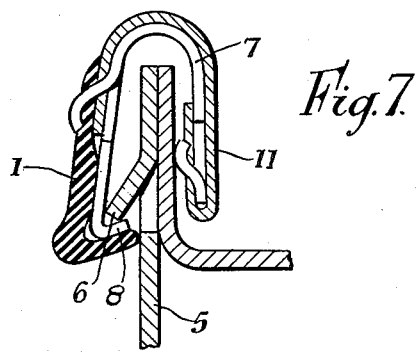
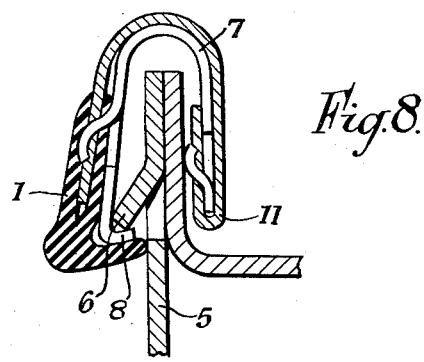

United States Patent Office 2,968,072
Patented Jan. 17, 1961

2,968,072

DRAUGHT EXCLUDING STRIPS, BEADINGS, MOULDINGS OR THE LIKE

Thomas John Robert Bright, The Lodge, Leek Wootton, Warwick, Warwickshire, England Filed Apr. 29, 1954, Ser. No. 426,456

1 Claim. (Cl. 20—69)

The present invention, although applicable to beadings, mouldings or the like is primarily concerned with draught excluding strips the phrase "draught excluding strip" being intended to cover any form of strip which is used between two component parts to exclude or assist in the exclusion of draughts, moisture and the like such as, for example, between a hinged or otherwise movable component such as, for example, a door, window or other hinged part and a fixed component. The strip forming the subject of the present application is intended for mounting on a supporting flange or equivalent part and consequently has certain features in common with the constructions disclosed by my earlier Patent No. 649,137. Such draught excluding strips are employed on motor road vehicles as a seal between the car doors and body to exclude draughts and to prevent the ingress of moisture and dust and include a rubber or other soft but resilient effective portion which when sandwiched between the door and a part of the vehicle body such as the supporting flange carrying the strip produces the desired sealing effect. Such strip is as disclosed by the specification of my earlier patent carried by a continuous clip or a series of clips of channel or U shape in cross-section, the clips being so formed that they can be sprung into position on the flange and have a positive interlocking connection therewith or with parts associated with said flange such as, for example, suitably spaced spring tags which are sprung into position on the flange, the clip or clips which would otherwise be observable from the inside of the vehicle having a fabric or other covering designed to harmonise with the interior furnishings of the vehicle body, the covering material like the effective portion being usually secured in position by stitching.

Some motor body manufactures prefer to leave a comparatively wide gap between the doors and body, this gap being subject to considerable variation and in such cases the effective portion projects laterally from one side of the clip or clips and is of considerable size, for example, of tubular form or composed of a soft but resilient material such as rubber. In such cases the effective portion may be connected with the clip through the medium of an attachment portion and although the invention is applicable to such constructions it is also applicable in cases where due to the gap being quite small the effective portion is much less obtrusive and in fact compares with the attachment portion previously employed, the attachment portion consequently fulfilling both the function of an effective portion and attachment portion.

The chief object of the present invention is to evolve an improved method of construction which will avoid the use of stitching or adhesive to secure the effective portion or combined effective and attachment portion and fabric or other covering to the clip or clips.

A draught excluding strip, beading or moulding including a soft but resilient part constituting an effective portion or combined effective and attachment portion an associated channel or inverted U-haped clip or clips for securing the strip in position upon a supporting flange or similar support and a fabric or other covering material extending over said clip or clips is characterised according to the invention in that the clip or clips are formed with pressed out tangs which fulfill the dual purpose of securing both the covering material and effective portion or combined effective and attachment portion in position on the clip or clips.

In order that the invention may be clearly understood and readily carried into effect the invention is hereinafter described with reference to the accompanying drawings in which:

Figures 1, 1a and 2 illustrate one form of draught excluding strip in accordance with the invention, Figure 2 showing the strip in position on a supporting flange;

Figures 3, 4 and 5 illustrate three alternative forms having the common feature of a prominent effective portion;

Figures 6, 7 and 8 illustrate three further alternative constructions which include a combined effective and attachment portion.

Referring in the first case to Figures 1, 1a and 2 of the accompanying drawings the draught excluding strip includes a tubular effective portion 1 which is formed integrally with an attachment portion 2 and is connected thereto by means of a relatively short neck 3, the attachment portion also including an inwardly directed lip 4 which forms an auxiliary seal and as shown in Figure 2 engages the flange 5 and prevents entry of rain or moisture into the interior of the metal clip or clips which as shown in Figure 2 make position interlocking engagement with a projection 6 on the supporting flange.

The clip or clips are substantially of the type previously described in my earlier patent specification No. 649,137, the clip, if one is employed, extending continuously through the length of the strip and being produced from strip aluminium or other suitable material such as, for example, suitable plastic, the clip 7 having an inwardly directed lip 8 which is sprung over the edge of the part 6 and thus provides the desired positive interlock to prevent accidental removal of the clip from the flange. It is proposed as hitherto that the clip shall be slit transversely from its opposite edges at spaced points throughout its length, the slits being staggered, the length or depth of the slits being substantially greater than half the width of the strip from which the metal clip is formed so that the clip can be bent to follow quite a small radius of curvature. Alternatively instead of using a continuous clip a plurality of U-shaped components may be employed which are spaced apart throughout the length of the strip.

It is preferred to construct the effective portion 1, attachment portion 2 and lip 4 integrally from rubber or other suitable soft but resilient material by a moulding or extrusion process the rubber component as is shown in Figures 1 and 2 being held in position on the clip by tangs 9 and 10, the tang 10 passing through the attachment portion 2 and a fabric or other covering material 11 which may have a pile or other ornamental surface 12, the tang 10 therefore effectively securing both the attachment portion 2 and covering material to its associated metal clip. The opposite edge of the covering material 11 is turned over the edge of the clip as shown and is secured by the tangs 9. Figure 1a shows the preferred arrangement of the tangs wherein the tangs lie lengthwise of the clip as distinct from at right angles. Such an arrangement facilitates manufacture as the tangs can be turned over into gripping engagement with the rubber effective portion and covering by passing the strip between suitable rollers. Although in the constructions hereinafter described and shown the tangs are arranged as in Figure 1 it is preferred for the above reason that they shall be arranged as in Figure 1a. Although it is within the scope of the invention to stitch the covering material to the attachment portion prior to its application to the clip this is considered to be unnecessary as the components can be easily applied to the clip together, the tangs being finally turned over or clenched to hold the parts in position.

In the case of Figure 3 the effective portion 1 is of tubular form and the covering material 11 totally encloses the effective portion, the covering material being doubled back on itself as at 13 and then passed over the outer surface of the clip and finally secured by the tang 9 as previously described in connection with Figures 1 and 2. This covering material may be of fabric or other suitable material and may be ornamental in any suitable way and may, in fact, take the form of an asbestos cloth or the like if it is intended that the seal shall be associated with a fireproof bulkhead or used under similar circumstances where the fire risk has to be taken into consideration.

Figures 4 and 5 show two further alternative constructions, the constructions being similar in that the covering material 11 is secured at one edge to the lower part of the clip 7 adjacent the lip 8, the covering material then passing around the tubular effective portion over the upper curved part of the clip and down the other side and finally turned upwardly and held in position by means of the tang 9. In the case of Figure 5, however, an additional tang 14 is provided which provides an additional attachment for the covering material.

In any of the constructions hereinbefore described the effective portion instead of being of the circular tubular form illustrated may be of any other suitable cross-sectional shape and it may be composed of sponge rubber or other solid construction which will be sufficiently soft but resilient to ensure a good seal between the door and body component in the case of the application of the strip to a motor vehicle. It will be appreciated in this connection that the effective portion will be partly compressed so as to provide the required sealing effect.

In all the constructions previously described the effective portion was quite prominent as the strip was intended for use in cases where there was a substantial gap between the parts to be sealed. In the constructions about to be described which are intended for use with a smaller gap the part 1 which is preferably composed of rubber or other soft but resilientm aterial fulfills the purposes of an effective portion and attachment portion, the outer surface of the part 1 being engaged by one of the components, for example, the door to provide a good seal. In this connection it will be appreciated that in use the strip when in position on a supporting flange will take up the tilted position shown and consequently even in the case of Figure 6 in which the covering material overlies the part 1 the latter will be engaged by the door when closed. The resilient sealing effect will be enhanced by reason of the lip 4 engaging the supporting flange and tending to cause the part 1 to stand away from the flange at its lower edge.

Figures 6 and 7 are sufficiently illustrative to need no further description but in the case of Figure 8 the part 1 is split or slotted to receive the edge of the covering material 11.

In each case the covering material and combined effective and attachment portions are secured by tangs 9 and 10. The covering material may be a woven or other fabric which may have an ornamental surface such as, for example, a layer of flock or other material which may be sprayed on or otherwise applied. Alternatively the covering may be of rubber, plastic or other suitable material which may have an ornamental surface imparted to it during or subsequent to manufacture.

In the case of the strip being used merely as a beading or moulding the effective portion will merely have an ornamental appearance and need not necessarily provide a seal in which case, of course, the effective portion may be of a cross-sectional shape quite different from the section illustrated in the accompanying drawings.

Furthermore, although the clip is shown in positive interlocking connection with a projection formed integrally with the supporting flange, the lip 9 may be arranged to override a series of spaced spring tags which are sprung into position on the flange and are frictionally held thereon.

Although the effective portion or combined effective and attachment portion and covering material may be applied to the clip when the latter has been bent into U shape it is preferred that they shall be applied when the clip is in flat strip form, the strip being then bent to the required cross-sectional shape thus having the effect of tightening the covering material and improving its general appearance.

I claim:

A draught excluding strip for vehicle doors comprising a continuous U section clip, said clip including an integral lip for maintaining a snap-on connection with a supporting flange on a vehicle, sealing means comprising a soft but resilient material including an effective portion compressible between a door and a fixed part of a vehicle and an integral attachment portion lying on one face of a limb of the U section clip, ornamental covering means enclosing the clip and attachment portion, one edge of the covering means being turned upwardly around one edge of the clip into the interior thereof, said clips having two sets of tangs, one set being pressed outwardly out of one limb and perforating both attachment portion and covering means, and the other set pressed inwardly out of the other limb and perforating only the upwardly turned part of the covering means, both sets of tangs having their extremities turned over to hold the parts firmly together.

References Cited in the file of this patent

UNITED STATES PATENTS

| | | |
|---|---|---|
| 1,379,001 | Diven | May 24, 1921 |
| 2,554,452 | Bright | May 22, 1951 |
| 2,664,602 | Bright | Jan. 5, 1954 |
| 2,724,877 | Ramsay | Nov. 29, 1955 |